Jan. 14, 1958 J. W. RIEKE 2,820,157
RELAY CIRCUIT
Filed Oct. 29, 1954
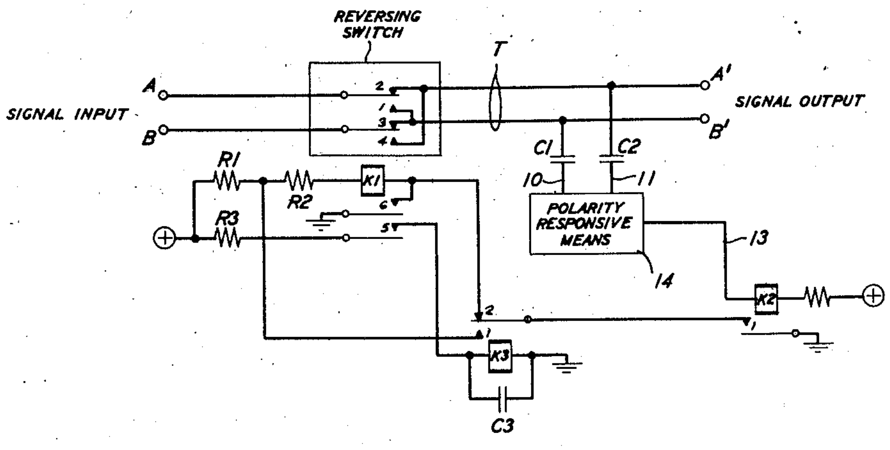
INVENTOR
J. W. RIEKE
BY
[signature]
ATTORNEY

United States Patent Office 2,820,157

Patented Jan. 14, 1958

2,820,157

RELAY CIRCUIT

John W. Rieke, Basking Ridge, N. J., assignor to Bell Telephone Laboratories, Incorporated, New York, N. Y., a corporation of New York Application October 29, 1954, Serial No. 465,542

15 Claims. (Cl. 307—132)

This invention relates to relay circuits and more particularly to relay circuits employed to effect a switching operation.

An object of the invention is to simply, easily and automatically switch a circuit whenever a particular external condition is present.

Another object of the invention is to maintain a switched circuit situation obtaining when the external condition is removed.

Still another object of the invention is to attain the above objects economically, and without the use of expensive relays of the polar type.

A feature of the invention is reversing or two-state switch means cooperating with and controlled by an oscillator circuit.

Another feature of the invention pertains to the use of inexpensive neutral relays to obtain the objects of the invention.

Another feature of the invention relates to a relay oscillator circuit energizable by the presence of a particular external condition, e. g., ground, to change the state of switch means repetitively.

Still another feature of the invention pertains to circuit means for holding the switch means in whichever condition or state obtains when the external condition is removed.

Yet another feature of the invention resides in a two-relay oscillator circuit provided with means to switch input and output connections of a transmission line whenever the particular external condition is present and to maintain the instant connections whenever the particular external condition is absent.

More particularly, a feature of the invention pertains to a reversing switch associated with a transmission line, a two-relay oscillator circuit controlling the reversing switch, means for energizing the oscillator circuit whenever a particular external condition dictates, and means associated with the oscillator circuit for maintaining the reversing switch in either its operated or non-operated condition depending upon which condition obtains when the external ground is removed.

These and other objects and features may be more clearly understood when the following description is read with reference to the drawing in which a schematic of the reversing switch and relay oscillator circuit cooperating with a transmission line and polarity responsive means is illustrated.

It will be noted that the presence or absence of the aforementioned external condition, which condition is taken to be the presence or absence of ground in the present exemplary embodiment of the invention, is governed by the operated or released condition of the relay K2.

In one particular application of this novel circuit it is associated with a television polarizing circuit and transmission line in such a fashion that whenever a television signal of an incorrect polarity is detected, polarity responsive means 14 places ground on the oscillator circuit, by operating the relay K2, which in turn reverses the terminals of the transmission line. The polarity responsive means 14, it will be noted, is connected through leads 10 and 11 and capacitors C1 and C2 to respective sides of the transmission line T and output lead 13 is connected to one side of relay K2. This application of the present invention is disclosed and claimed in the copending application of B. M. Bowman and J. W. Rieke, Serial No. 465,541, filed October 29, 1954.

It is of significance to the present invention, of course, only that the relay K2 be operated and released at times in order to illustrate the operative principles and application of the invention. It is not necessary to the functioning of the invention that relay K2 be controlled in any way by what appears on a transmission line, but the invention is proving particularly useful in connection with such a polarity recognizer circuit.

Ordinarily the input terminals A and B are connected through back contacts 2 and 3 of relay K1 to the output terminals A′ and B′. Whenever an incorrect polarity occurs it is desired that relay K1 be operated whereby the reversing switch (consisting of contacts 1, 2, 3 and 4 of relay K1) will reverse the input terminals A and B with respect to output terminals A′ and B′. Under this reversing process, input terminal A is connected through a front or make contact (closed when relay K1 is operated) of relay K1 to output terminal B′ and input terminal B is connected through a make contact 4 of relay K1 to output terminal A′.

This one operation of the reversal switch corrects the polarity of the television signal, for example, as it reenters the transmission line unless the signal's polarity is oscillating. If polarity correction is obtained by one operation of the reversing switch the polarity responsive means 14 removes ground from relay K2 which in turn removes ground from the oscillator circuit and, as a result, relay K1 is maintained operated. If some instability causes alternating incorrect polarities to occur, design criteria require that the reversing switch change the connections at the output terminals until such time as a correct polarity is detected to cause relay K2 to release.

Upon a release of relay K2 it is necessary that relay K1 maintains its operated or released condition whichever obtains at the time relay K2 releases in order to maintain the correct relation between input and output terminals existing when a signal of correct polarity is detected.

The winding of relay K2 has one side connected to polarity responsive means 14 and the other side connected to positive battery (negative being grounded). Positive battery is connected also through resistors R1 and R2 to one side of the winding of relay K1 and through resistor R3 and over make contact 5 of relay K1 to one side of the winding of relay K3. The other side of the winding of relay K1 is connected over a back contact 2 of relay K3 and a make contact 1 of relay K2 to ground. A locking path for relay K1 is provided to ground over make contact 6 on relay K1. A shunt path for the winding of relay K1 is provided over a make contact 1 on relay K3. The other side of the winding of relay K3 is connected to ground and a capacitor C3 shunts the winding of relay K3. It is to be noted that resistors R1, R2 and R3 are provided merely to reduce the magnitude of positive battery applied to the windings of relays K1 and K3.

The oscillator circuit which controls the reversing switch operates as follows: Whenever relay K2 is operated, an operating path for relay K1 is completed from ground over contact 1 of relay K2 and contact 2 of relay K3, through the winding of relay K1, and through the resistors R1 and R2 to positive battery. Relay K1, in operating, locks up over its own contact 6 to ground and also completes an operating circuit for relay K3 from ground through the winding of relay K3, over contact 5 of relay K1, and through resistor R3 to positive battery. The completion of this circuit causes relay K3 to operate. After relay K3 is operated, positive battery continues to charge capacitor C3. Also, upon the operation of relay K3, the shunting path for relay K1 over contact 1 of relay K3 is closed and, provided relay K2 is still operated, the completion of this shunting path causes relay K1 to release. The release of relay K1 interrupts the operating circuit of relay K3. However, there is a certain time delay after the interruption of relays K3's operating path before relay K3 releases. This is due to the capacitor C3 and the winding resistance of the relay which form a resistance-capacity discharge circuit. The time delay between the interruption of the operating circuit of relay K3 and the release of relay K3 depends upon the time constant of the discharge circuit, which in turn depends upon the magnitude of the resistance of the winding of relay K3 and the value of capacitor C3.

The time constant of this discharge circuit is not too critical insofar as the instant invention is concerned. It need only be large enough for the polarity responsive means 14 (which maintains relay K2 closed) to redetermine the transmission line polarity and, if correct, cause relay K2 to release before relay K3 releases.

In the polarizing circuit referred to above, typical component values are as follows:

R1=6.49KΩ
R2=3.9KΩ
R3=14.7KΩ
K3 winding resistance=2.5KΩ
C3=25 μf.
Battery source=190 v.

The values of R1, R2 and R3 are chosen to tailor the values of positive battery to the relays employed. There is, of course, no reason why relays K1 and K3 cannot have the same internal resistance, but if either or both are different, the values of resistance and/or battery source must change.

Resistance R1 is split from R2 in order to prevent the battery from being directly grounded when the relay K3 is operated and the relay K2 is operated. This is necessary to avoid burning out the battery.

Upon the release of relay K3, coupled with the previous release of K1, and the continued operated condition of relay K2 (indicating the wrong polarity television signal is still present), relay K1 again operates and in turn allows K3 to operate, which in turns closes the shunt path across the winding of relay K1, which, in turn, in releasing, again releases K3. As long as relay K2 remains operated relays K1 and K3 continue to oscillate in this repetitious manner. Each time relay K1 operates or releases the manner in which the input terminals A and B are connected to the output terminals A′ and B′ of the transmission line is reversed.

The relay oscillator circuit comprising relays K1 and K3, as has previously been pointed out, is so designed that relay K1 remains in its operated or released condition, whichever condition obtains at the time relay K2 releases. Hence, if the polarity at the incoming terminals A and B is detected as incorrect polarity responsive means 14 completes the circuit for relay K2 to then operate it. Relay K1, in operating, will reverse the polarity by activating the reversing switch. In a first case, if this one reversal of terminals corrects the polarity of the outgoing television signal, relay K2 will release but relay K1 will remain in an operated condition and relay K3 will operate, if it has not already done so, and then remain operated. In a second case, if the polarity of the outgoing television signal is corrected (evidenced by the release of relay K2) before relay K1 is operated, nothing will happen for relay K1 will maintain its released condition without operating the reversing switch. In a third case, if the incorrect polarity of the television signal is corrected after relay K1 has released but before relay K3 has released, relay K1 will remain in its released condition thereby continuing the instant position of the reversing switch. Relay K3, however, will release in time and will remain released.

In the circuit, as above described, it is readily apparent that the oscillator circuit in conjunction with the reversing switch provides means for constantly compensating for incorrect polarities of incoming television signals as evidenced by the state of the output lead 13 of the polarity responsive means 14. The reversing switch is maintained in a position corresponding to the stabilized position until such time in the future as relay K2 again operates to indicate that an incorrect signal polarity is present.

It will be apparent that the value of such an oscillator circuit and reversing switch is not limited to its use in a television polarity recognizer circuit as herein used for illustrative purposes, but is capable of many varied applications. Wherever a continuously compensating means is needed which maintains its instant position upon the correction of a stated condition the oscillator circuit and reversing switch herein disclosed and claimed will be found useful.

It is to be understood, therefore, that the above-described arrangements are but illustrative of the application of the principles of the invention. Numerous other arrangements may be devised by those persons skilled in the art without departing from the spirit and scope of the invention.

What is claimed is:

1. A relay, enabling means operated at times and released at times, means effective upon the operation of said enabling means to cause said relay to operate repetitively and to release, and means effective upon the release of said enabling means to cause said relay to remain in its operated or released condition whichever prevails at the time said enabling means is released.

2. A neutral relay, a source of direct current, a direct-current circuit for controlling said relay, means for applying said source to and removing said source from said circuit, said circuit including means controlled by the application of said source to said circuit to cause said relay repetitively to operate and to release, and means controlled by the removal of said source from said circuit to cause said relay to remain in its operated or released condition whichever obtains upon said removal.

3. A first relay, means for causing said first relay to operate at times and release at times, a second relay, means effective upon the operation of said first relay to cause said second relay to operate and to release at a controlled rate as long as said first relay is operated, and means effective upon the release of said first relay to cause said second relay to remain in its operated or released condition whichever prevails at the time said first relay is released.

4. A pair of relays, enabling means operated at times and released at times, means effective upon the operation of said enabling means to cause said pair of relays repetitively to operate sequentially in a given order and to release sequentially in the same given order, and means effective upon the release of said enabling means to cause said pair of relays to stop said sequential operation and release at the completion of the sequence which prevails at the time said enabling means is released.

5. A pair of relays, enabling means operated at times and released at times, means effective upon the operation of said enabling means to cause one of said pair of relays to operate and to release periodically, other means effective upon the release of said enabling means to hold said one relay in its operated or released condition whichever obtains upon the release of said enabling means, and other means responsive to the functioning of said one relay to cause the other relay to function similarly.

6. A relay oscillator circuit comprising a pair of relays having energizable windings, a source of direct current, a direct-current circuit including said windings, means for applying said source to said circuit at times and removing said source from said circuit at times, means cooperating with said circuit and effective whenever said source is applied to said circuit to cause one of said relays to operate and to release periodically, other means cooperating with said circuit and effective whenever said source is removed from said circuit to cause said one relay to remain operated or released whichever condition prevails upon said removal, and other means cooperating with said circuit to cause the other relay to operate and to release in response to respective operations and releases of said one relay.

7. A relay oscillator comprising a switching relay, enabling means operated at times and released at times, first circuit means responsive to the operation of said enabling means to cause said switching relay to oscillate between an operated and a released condition, said circuit means including a slave relay and means controlled by said switching relay to cause said slave relay to follow the oscillations of said switching relay, and second circuit means responsive to the release of said enabling means to cause said switching relay to remain operated or released whichever condition prevails when said enabling means is released.

8. A relay oscillator circuit comprising enabling means operated at times and released at times, a first neutral relay, means effective upon the operation of said enabling means to cause said first relay repetitively to operate and to release, a second neutral relay, first means effective upon the operation of said first relay to operate said second relay, means effective upon the operation of said second relay when said enabling means is operated to release said first relay, means effective upon the release of said first relay to release said second relay, said first means repeating the operating and releasing cycle of said first and second relays as long as said enabling means is operated, and means effective upon a release of said enabling means to cause said first relay to remain in its operated or released condition whichever prevails at the time said enabling means is released.

9. A direct-current relay oscillator circuit comprising enabling means operated at times and released at times, a first relay, control means effective upon the operation of said enabling means to cause said first relay to operate and to release periodically, a second relay, means effective upon the operation of said first relay to operate said second relay and effective upon the release of said first relay to release said second relay, means effective upon the operation of said second relay when said enabling means is operated to release said first relay, said control means effective again upon the release of said second relay provided said enabling means is operated to reoperate said first relay to repeat the operating and releasing cycle of said first and second relays, and means effective upon the release of said enabling means to cause said first relay to remain in its operated or released condition whichever prevails at the time said enabling means is released.

10. A relay oscillator circuit comprising enabling means operated at times and released at times, a first relay, control means effective upon the operation of said enabling means to cause said first relay to operate and to release periodically, a second relay, means effective upon the operation of said first relay to operate said second relay and effective upon the release of said first relay to start the release of said second relay, means effective upon the operation of said second relay when said enabling means is operated to release said first relay, capacitor means in shunt of said second relay to delay the release thereof, said control means effective again upon the release of said second relay provided said enabling means is operated to reoperate said first relay to repeat the operating and releasing cycle of said first and second relays, and means effective upon the release of said enabling means to cause said first relay to remain in its operated or released condition whichever prevails at the time said enabling means is released.

11. A relay circuit for operating a switch comprising a first neutral relay, means for causing said first relay to operate at times and to release at times, a second neutral relay, control means effective upon the operation of said first relay to cause said second relay to operate and to release periodically, means whereby the respective operations and releases of said second relay cause the operation and release of said switch, a third neutral relay, means effective upon the operation of said second relay to operate said third relay and effective upon the release of said second relay to release said third relay, means effective upon the operation of said third relay provided said first relay is operated to release said second relay, capacitor means in shunt of said third relay to delay the release thereof, said control means effective again upon the release of said third relay provided said first relay is operated to reoperate said second relay to repeat the operating and releasing cycle of said second and third relays, and means effective upon the release of said first relay to cause said second relay to remain in its operated or released condition whichever prevails at the time said first relay is released, thereby maintaining said switch in its corresponding operated or non-operated position.

12. A relay circuit for operating a switch comprising a first source of direct current, a first neutral relay having an energizable winding, means for connecting said first source to the winding of said first relay at times whereby said first relay operates, a second source of direct current, a second neutral relay having an energizable winding, a third neutral relay having an energizable winding, control means effective upon the operation of said first relay and non-operation of said third relay to connect said second source to the winding of said second relay thereby operating it, means whereby the respective operations and releases of said second relay cause the operation and release of said switch, means for locking said second relay operated, means effective upon the operation of said second relay to connect said second source to the winding of said third relay to operate it and effective upon the release of said second relay to disconnect said source from the winding of said third relay thereby starting it to release, means effective upon the operation of said third relay provided said first relay is operated to shunt the winding of said second relay thereby neutralizing said locking means and causing said second relay to release, capacitor means in shunt of the winding of said third relay to delay the release thereof, said control means effective again upon the release of said third relay provided said first relay is operated to again connect said second source to the winding of said second relay to repeat the operating and releasing cycle of said second and third relays, and means effective upon the release of said first relay to cause said second relay to remain in its operated or released condition whichever prevails at the time said first relay is released, thereby maintaining said switch in its corresponding operated or non-operated position.

13. In a relay circuit, a first relay, means for causing said first relay to operate at times and to release at times, a second relay, a third relay, first circuit means effective whenever said first relay is operated and said third relay is released to cause said second relay to operate, second circuit means effective whenever said second relay is operated to cause said third relay to operate and effective whenever said second relay is released to cause said third relay to start to release, third circuit means effective whenever said first and second and third relays are operated to cause said second relay to release, and fourth circuit means effective whenever said second relay is operated and said first relay is released to hold said second relay operated.

14. The invention claimed in claim 13 wherein means is provided to delay the release of said third relay after the start thereof.

15. The invention claimed in claim 14 wherein said delay means comprises a capacitor in shunt of said third relay.

No references cited.